United States Patent

[11] 3,540,558

| [72] | Inventor | Alan S. Lamburn |
| | | Kencott, via Lechlade, England |
| [21] | Appl. No. | 768,746 |
| [22] | Filed | Oct. 18, 1968 |
| [45] | Patented | Nov. 17, 1970 |
| [73] | Assignee | Auto Transmissions Limited |
| | | London, England |

[54] FLUID CONTROL CIRCUIT
13 Claims, 8 Drawing Figs.

[52] U.S. Cl. .................................................. 192/85;
74/781
[51] Int. Cl. ....................................................... F16h 3/44;
F16d 19/00
[50] Field of Search .......................................... 74/640,
781; 192/85, 87.14, 87.18, 109(F)

[56] References Cited
UNITED STATES PATENTS

| 2,939,557 | 6/1960 | Dabich et al. ............... | 192/85X |
| 3,215,236 | 11/1965 | Pensa ........................ | 192/85 |
| 3,334,530 | 8/1967 | Lamburn et al. ........... | 74/781 |

Primary Examiner—Robert M. Walker
Attorney—Holman, Glascock, Downing and Seebold ABSTRACT: In change-speed gearing, one ratio is engaged when bias means urges an accumulator piston against a first stop and reacts against a relief valve piston to control operating fluid pressure at a low value above atmospheric, another ratio is engaged when the fluid pressure is applied to the accumulator piston and urges it against a second stop to increase the bias force and thereby the pressure to a high value. Fluid displacement through a restrictor by the accumulator piston, when a change is made from the other ratio to the one ratio slows the drop in pressure until the accumulator piston reaches the one stop.

FLUID CONTROL CIRCUIT

This invention relates to a fluid control circuit for operating a ratio selecting friction-engaging element in a change-speed gearing and is applicable particularly, but not exclusively, to an auxiliary change-speed epicyclic gearing providing two optionally selectable forward drive ratios.

Gearing of this type is sometimes arranged such that, when a change of drive ratio is made from a higher to a lower ratio, such as from an overdrive ratio to a direct drive ratio, and drive torque is applied by an engine to the gearing during the change, the ratio selecting friction engaging element is disengaged from the member providing the higher ratio and is maintained in the disengaged condition for a period to allow the engine speed to rise towards synchronism of the lower ratio before the friction-engaging element is engaged with the member providing the lower ratio. The drive torque provided by the change-speed gearing during such a sequence changes from the drive torque of the higher ratio, to zero drive torque and then to the drive torque of the lower ratio and this sudden discontinuity in drive torque from the gearing tends to generate undesirable jerkiness. An object of this invention is to reduce such jerkiness.

According to the invention, a fluid control circuit for operating a ratio selecting friction-engaging element in a change-speed gearing includes means arranged to regulate the operating pressure of the fluid alternately between a predetermined high value, at which the friction-engaging element is operated to a first condition for selecting one drive ratio of the gearing, and a predetermined low value that is above atmospheric pressure at which the friction-engaging element is operated to a second condition for selecting another drive ratio of the gearing, said regulating means is arranged to reduce the rate at which the pressure falls from the high to the low value for part of the time that the friction-engaging element is disengaging the said one drive ratio and engaging the said other drive ratio before dropping at a greater rate to the said low value, whereby to reduce the shock of engagement of the said other drive ratio.

According to a feature of the invention, the regulating means may include a relief valve piston and an accumulator piston urged axially apart by bias means, the accumulator piston has a greater effective area than the relief valve piston and is urged against a first stop by the bias means when no operating fluid pressure is applied to the accumulator piston, and is urged against a second stop by operating fluid pressure when it is applied to the accumulator piston in opposition to the bias means, the relief valve piston controls the size of an aperture through which pressurised operating fluid may escape such that when the accumulator piston engages its first or second stops the bias means exerts a force on the relief valve piston to control the pressure of the operating fluid to be at the low or the high pressure respectively, a control valve is arranged optionally either to connect the pressurised operating fluid to move the accumulator piston from the first stop to the second stop for changing the gearing from the said other drive ratio to the said one drive ratio, or to disconnect the pressurised operating fluid from the accumulator piston and to connect the accumulator piston to exhaust through a restrictor means for changing the gearing from the said one drive ratio to the said other drive ratio, whereby movement of the accumulator piston from the said second stop to the said first stop is slowed by the fluid which the accumulator piston displaces through the restrictor, so that the operating fluid pressure in the system will fall slowly until the accumulator piston abuts the first stop after which the pressure will fall quickly to the said low value.

According to another feature the bias means may include a first bias element acting on the relief valve piston, a second bias element acting on the accumulator piston, the first and second bias elements react in opposite directions on a first abutment member which is arranged to abut the accumulator piston when a predetermined load in the second bias element is reached, whereby as the accumulator piston moves away from the second stop the first abutment member and the entrapped second bias element also move away from the second stop and the relief valve piston causing the bias in the first bias element and therefore the pressure in the system to be reduced rapidly to a first intermediate value at which the friction-engaging element moves out of engagement with the one drive ratio and into partial engagement with the other drive ratio, and when the force exerted by the operating fluid on the accumulator piston falls below said predetermined load the second bias element extends so that the accumulator piston displaces more fluid through the restrictor whereupon the pressure in the system will fall slowly while engagement of the said other drive ratio continues. Preferably the first abutment member is arranged at a predetermined point in its movement to abut a stationary part of the regulating means which constitutes the said second stop.

According to a further feature the control circuit may include first inhibitor means to inhibit further extension of the said second bias element before the accumulator piston reaches the said first stop whereby the pressure in the system will drop quickly so that the final part of the engagement of the said other drive ratio is completed quickly.

According to yet another feature the said first bias element may react against the relief valve piston from the said high pressure at which the accumulator piston will engage the said second stop at least down to the first intermediate pressure at which the second bias element becomes operative by the disengagement of the said first abutment member from the accumulator piston, second inhibitor means inhibits further extension of the said first bias element when the pressure of the operating fluid falls below said first intermediate pressure, and a third bias element is operative on the relief valve piston at pressures at least below that at which the said first inhibitor means inhibits further extension of the said second bias element. Preferably the first bias element reacts on the relief valve piston, the third bias element reacts on the first abutment member, the first and third bias elements act in opposite directions on a second abutment member which is arranged to abut the first abutment member when the third bias element is to be rendered inoperative.

According to another feature the first inhibitor means may include the first abutment member which is arranged to reach a third abutment member fast with the accumulator piston when further extension of the said second bias element is to be inhibited.

According to a further feature the second inhibitor means may include the second abutment member which is arranged to reach a fourth abutment member fast with the relief valve piston when further extension of the said first bias element is to be inhibited.

According to yet another feature the control circuit may include a fourth bias element acting on the accumulator piston in the same direction as the second bias element and reacting on a fifth abutment member, the second and fourth bias elements together are arranged to move the accumulator piston away from the first abutment member when the pressure falls to a second intermediate value at which the friction-engaging element will slip if drive torque is being transmitted through the change-speed gearing, and the fluid displaced by the accumulator piston while the second and fourth bias elements are together moving the accumulator piston will cause the pressure to fall slowly whereby, if the change is from a high ratio to a low ratio and drive torque is being transmitted through the change-speed gearing, there will be time for at least partial synchronism of the said other drive ratio before the said one drive ratio is disengaged.

According to another feature the control circuit may include a third inhibitor means to inhibit further extension of the said fourth bias element before the pressure falls to the value at which the friction-engaging member moves into engagement with the said other ratio, whereby the pressure will fall rapidly from a value at which the friction-engaging member is in slipping engagement with part of the change-speed gearing providing the said one ratio to a value at which it is in slipping engagement with part of the change-speed gearing providing the said other ratio. Preferably the third inhibitor means includes a sixth abutment member fast with the third abutment member, and the fourth bias element is arranged to urge the fifth abutment member against the first abutment member until the pressure falls to a value where the fifth abutment member reaches the sixth abutment member to inhibit further extension of the fourth bias element. Furthermore at least one bias element is preferably a helically coiled compression spring.

According to a further feature, the first, second and third bias elements may be coaxial helically coiled compression springs, the first abutment member is a first coaxial cup shaped member lying substantially within the second bias element, the second bias element reacts against an outwardly turned flange formed at the open end of the first cup shaped member, a pin fast with the accumulator piston is slidable through a first coaxial bore in the closed end of the first cup shaped member and has a head larger than the said first bore to form the said third abutment member, the second abutment member is a second coaxial cup shaped member lying substantially within the first bias element, the first bias element reacts against an outwardly turned flange formed at the open end of the second cup shaped member, a pin fast with the relief valve piston is slidable through a second coaxial bore in the closed end of the second cup shaped member and has a head larger than the said second bore to form the said fourth abutment member, and the third bias element acts between the closed ends of the first and second cup shaped members. Preferably the restrictor means is an orifice.

The invention is now described, by way of example only, with reference to the accompanying drawings, in which.

Figure 1:
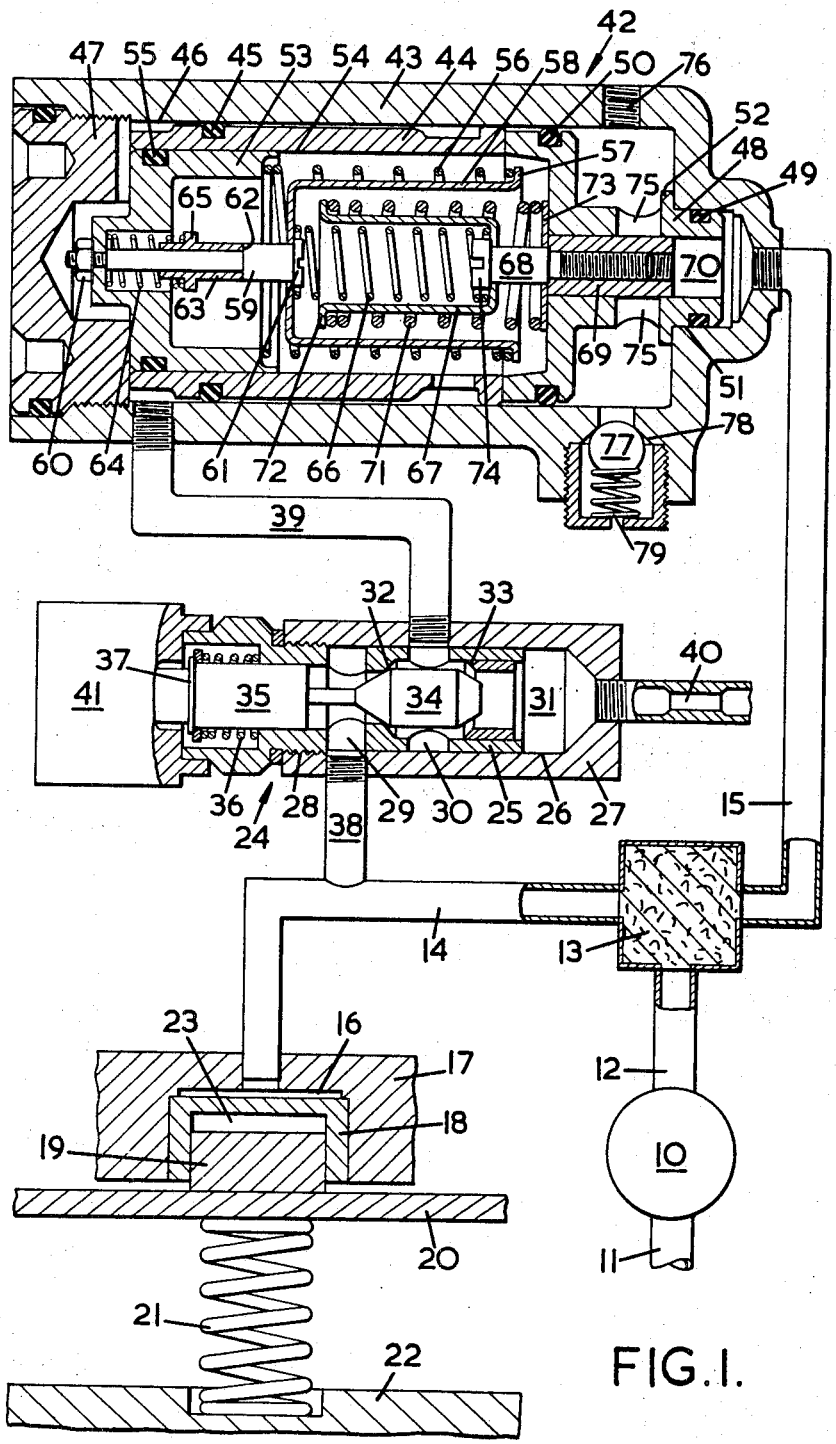
FIG. 1 shows one form of fluid pressure circuit for actuating a ratio-selecting member of a change-speed epicyclic gearing.
Figure 2:
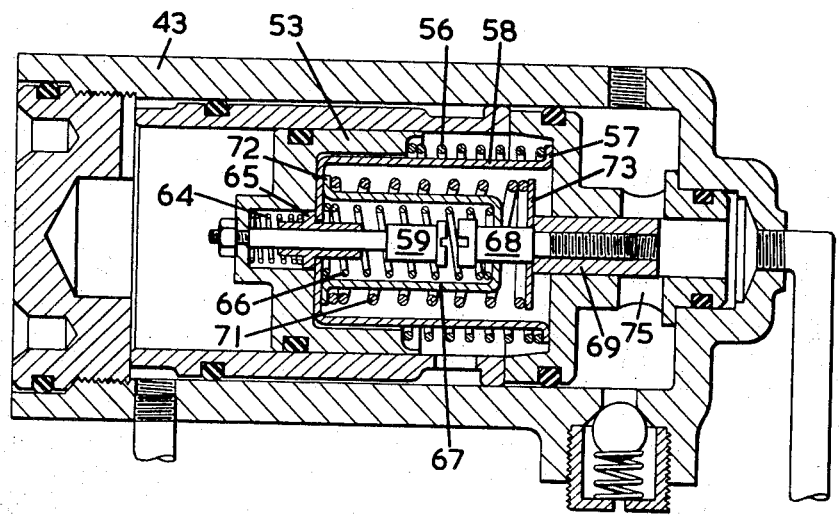
FIGS. 2, 3, 4 and 5 show successive phases of operation of the combined pressure relief valve and accumulator shown in FIG. 1.

The drawings are of a diagrammatic nature only, the details of construction will be easily understood by those versed in the art. In FIGS. 2 to 5, and 7 only the principal reference numerals have been used for clarity.

In FIG. 1, a pump 10 draws lubricating oil from an unseen sump through a suction pipe 11 and discharges through a delivery duct 12 to a filter 13 having two outlet ducts 14, 15, at the same pressure. Duct 14 is connected to a cylinder 16 formed in part of a casing 17 of the change-speed epicyclic gearing. A hollow piston 18 slides in the cylinder 16 and a further piston 19 slides inside the hollow piston 18. When a sufficient fluid pressure is applied to the piston 18 the latter moves a ratio-selecting clutch element 20 of the epicyclic gearing against preloaded compression coil springs 21 which react against another part of the casing 22 so as to engage one ratio of the epicyclic gearing. Subsequently, when the fluid pressure acting on the piston 18 is relaxed, the springs 21 move the clutch element 20 to the position shown in FIG. 1 so as to engage the other ratio of the epicyclic gearing. If preferred a frustoconical spring may be inserted in the space 23 between pistons 18 and 19 to cushion the engagement of the ratios. Alternatively piston 18 may be deleted and piston 19 arranged to slide directly in the casing 17.

A control valve 24 comprises a sleeve 25 arranged in a bore 26 of part of the casing 27 and held in place by screw-threads 28. The sleeve 25 defines three galleries 29, 30, 31 which are separated by two opposed frustoconical seatings 32, 33 for alternate coaction with a valve spool 34 having complementary frustoconical seatings as indicated. The spool 34 is carried by a spindle 35 and a compression coil spring 36 acts between the sleeve 25 and a flange 37 on the spindle 35 so as to bias the spool 34 into engagement with seating 32. In this manner a duct 38 connecting duct 14 to gallery 29 is disconnected from the gallery 30 which is connected to the gallery 31 and fluid is enabled to pass along a duct 39 from the relief valve and out through a restrictor 40 to the sump.

Spindle 35 constitutes the armature of a solenoid 41. When electric current is passed through the solenoid 41 the spindle 35 is moved against the bias of the spring 36 to move the spool 34 into engagement with the seating 33. In this manner the duct 39 is isolated from the restricted outlet 40 and is in communication with the pump 10 through ducts 12, 14 and 38 and galleries 29 and 30.

The combined accumulator and pressure relief valve 42 has a body 43 which may be part of the casing. A sleeve 44 sealed by an O-ring 45 is axially located in a bore 46 of the body 43 between the slotted end face of a screwed-in end plug 47 and a relief valve cylinder 48 which is sealed to the body 43 by O-rings 49, 50. The space outside the sleeve 44 between the O-rings 45 and 50 is vented to the sump by an unseen duct. The relief valve cylinder 48 is located to the body 43 by a spigot 51 and a flange 52.

An accumulator piston 53 is slidingly supported in a bore 54 of the sleeve 44 and is sealed by an O-ring 55. A preloaded outer helically coiled compression spring 56 has one end reacting against the piston 53 and the other end reacting against an outwardly turned flange 57 formed at the open end of a coaxial outer cup member 58 remote from the accumulator piston 53. A coaxial pin 59 is a sliding fit in a bore in the bottom of the outer cup member 58 and is held to the accumulator piston 53 by a nut 60. Axial separation of the outer cup member 58 from the accumulator piston 53, due to the outer spring 56, is limited by a head 61 on the pin 59.

The pin 59 is formed with a shoulder 62 against which a sleeve 63 slidably supported on the pin 59, is forced by a preloaded light helically coiled compression spring 64 reacting between the left hand end of the accumulator piston 53 and a flange 65 integral with the sleeve 63. A preloaded inner helically coiled compression spring 66 reacts between the bottom of the outer cup member 58 and the bottom of an oppositely facing concentric inner cup member 67 positioned inside the outer cup member 58, and thereby urges the preloaded assembly of the outer cup member 58, the spring 56 and the accumulator piston 53 to the left.

A coaxial pin 68 is slidable through the bottom of the inner cup member 67 and is screwed into a relief valve piston 69 which is slidably supported in a coaxial bore 70 in the relief valve cylinder 48. A preloaded intermediate coaxial helically coiled compression spring 71 reacts between an outwardly-turned flange 72, at the left hand end of the inner cup member 67, and a washer 73 also slidably supported on the pin 68. Axial separation of the inner cup member 67 and the washer 73, due to the intermediate spring 71, is limited by a head 74 on the pin 68 and the left hand end of the relief valve piston 69, respectively. The space between the accumulator piston 53 and the relief valve cylinder 48 is vented through an unseen duct to the sump.

With the solenoid 41 deenergised and the pump 10 inoperative there will be no residual fluid pressure in the system and the components will be substantially as shown in FIG. 1. When the pump 10 is started all its outlets are closed so that the pressure in the ducts 14 and 15 immediately starts to rise, as it does on the right hand end of the relief valve piston 69. This forces the piston 69 to the left, compressing the inner spring 66, until radial passages 75 are partially uncovered by the piston 69 to allow fluid to discharge through an outlet duct 76 to lubricate the epicyclic change-speed gearing. Excessive pressure in the passages 75 is avoided by a ball valve 77 which is urged against a conical seating 78 by a spring 79 and is arranged to open at a predetermined low bypass pressure.

Figure 5:
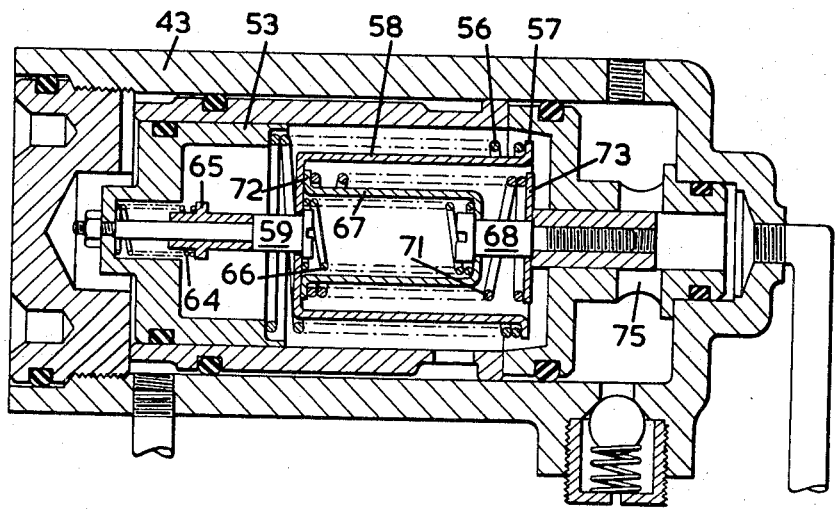

The pressure in the system stabilizes at a low value when the force on the relief valve piston 69 due to the fluid pressure is balanced by the force of compression of the inner spring 66. The pressure is then not great enough to move the piston 18 against the preload of the springs 21, nor to overcome the preload of the outer spring 56 or the intermediate spring 71, but is sufficiently above atmospheric pressure to be usable for lubrication purposes. In these conditions the relative position of the components is shown in FIG. 5 except that there would be a small gap between the flange 72 and the bottom of the outer cup member 58.

When electric current is supplied to the solenoid 41, the valve spool 34 is moved into engagement with the conical seating 33, thereby disconnecting the duct 39 from the exhaust restrictor 40 and connecting the duct 39 to the duct 38. In this way the low but positive pressure in the system is applied through ducts 38 and 39 to act on the accumulator piston 53, which is arranged to have a greater area than the relief valve piston 69.

The force on the accumulator piston 53 is adequate to overcome the preload of the various springs so that the piston 53 is moved towards the right. This process increases the axial force on the relief valve piston 69 which also moves to the right, thereby further restricting the flow of fluid through the bore 70 and radial passages 75. The pressure in the system is raised by this restriction thereby accelerating the movement of the accumulator piston to the right, which promotes further rise in pressure. This process continues until the components reach the position shown in FIG. 2, where the outer spring 56 is compressed until the left hand end of the outer cup member 58 abuts the accumulator piston 53, the inner spring is compressed until the flange 72 on the inner cup member 67 abuts the left hand end of the outer cup member 58, and the spring 64 is compressed by the left hand end of the outer cup member 58 abutting the flange 65. In this position of the components, extra force on the accumulator piston 53 is passed to the casing 43 without affecting the compression of the intermediate spring 71, which is compressed by the relief valve piston 69 until then force in the intermediate spring 71 balances the force due to the pressure of the fluid on the relief valve piston 69. In this way the pressure in the system becomes stabilized at a high value.

The rising pressure in the system is also applied to the piston 18 so that, when the preloaded force of the springs 21 is overcome, the ratio selecting clutch element is moved so as to disengage the said other ratio and to engage the said one ratio of the epicyclic change-speed gearing. Since the flow of fluid from the pump into the system is virtually unrestricted during the phase of rising pressure, the change of ratio occurs quickly, although the filling of the accumulator prevents the pressure rising so quickly as to cause a shock of engagement. The components stay in the position shown in FIG. 2 as long as the said one ratio is selected.

To select the engagement of the said other ratio, the supply of electric current is disconnected from solenoid 41 whereupon the spring 36 moves the valve spool 34 into engagement with the seating 32, which disconnects the duct 39 from the source of pressure and connects the duct 39 to the restricted outlet 40. The fluid pressure acting on the accumulator piston 53 starts to drop as fluid is exhausted through the restrictor 40 so that the force of the compressed springs starts to move the accumulator piston 53 towards the left. This movement in turn reduces the force on the relief valve piston 69 so that the pressure in the system, including that acting on the piston 18, falls to a value which at any instant is proportional to the pressure acting on the accumulator piston 53 in the ratio of the effective areas of the pistons 53 and 69.

Figure 3:
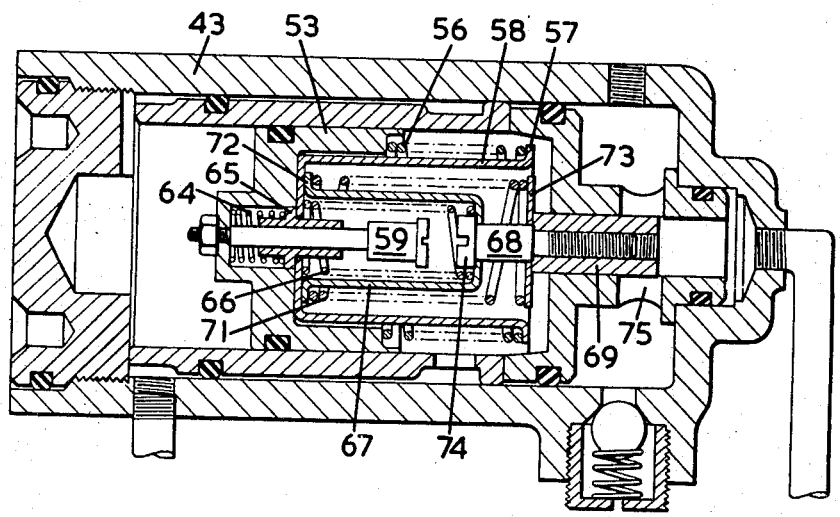
Figure 4:
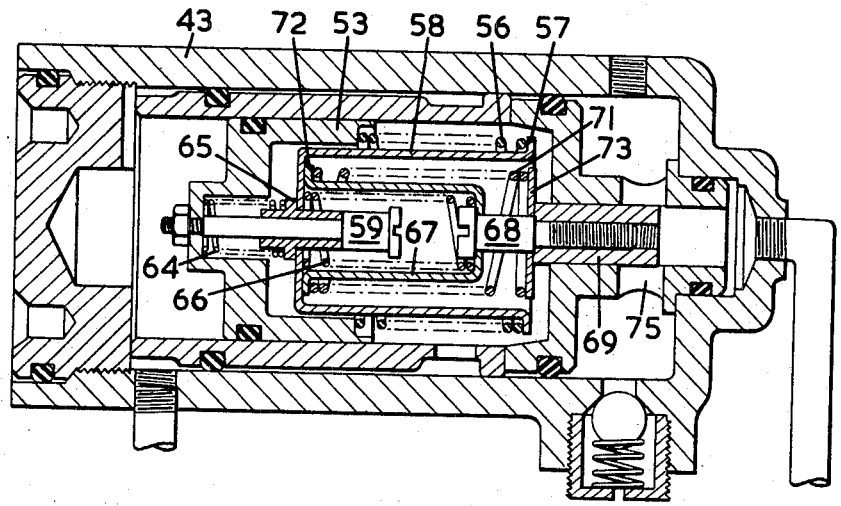
Figure 6:
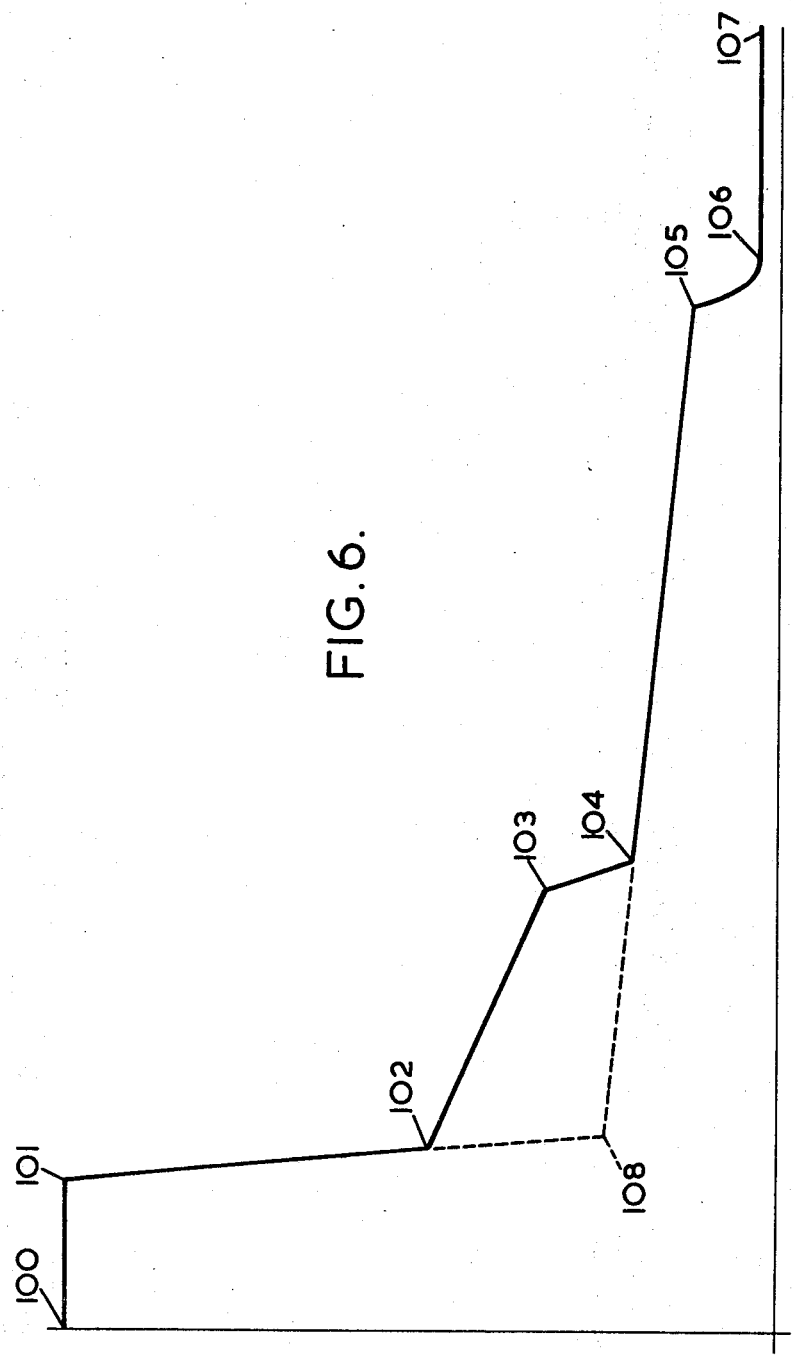
FIG. 6 is a graph illustrating the operation of the fluid pressure circuit of FIG. 1.

Various stages in the return of the accumulator piston 53 to its left hand position are shown in FIGS. 3, 4 and 5. The drop in pressure is shown in FIG. 6, which is a graph having pressure as ordinates and time abscissae The high stabilized pressure is indicated by the horizontal line from point 100 to point 101 at which the solenoid 41 is deenergised and the pressure falls steeply, since only the intermediate spring 71 is extending and little fluid is being exhausted, to point 102. The pressure at this point which is shown in FIG. 3, is still adequate to keep the ratio-selecting clutch element 20 engaging the said one ratio but is inadequate to prevent the clutch from slipping so that, if power is being applied to the change-speed gearing, the engine speed will rise whilst some drive will still take place. To give time for the engine speed to rise towards the speed for synchronism of the said other ratio, the pressure is sustained at a more level value from the point 102 to the point 103. At point 102 further extension of the intermediate spring 71 is prevented by the head 74 on the pin 68 reaching the bottom of the inner cup member 67. At this pressure the force of compression of the outer spring 56 and the light spring 64 is arranged to balance the fluid force on the accumulator piston 53. As pressure falls further both the outer spring 56 and the light spring extend causing a considerable quantity of fluid to be displaced by the accumulator piston 53. The flow of this fluid through the restrictor 40 sustains the pressure so that it falls slowly to point 103, where the shoulder 62 on the pin 59 abuts the sleeve 63, as shown in FIG. 4.

Due to the preload in the light spring 64, the pressure drops steeply from point 103 to point 104, at which the force on the piston 18 is no longer able to overcome the force of the springs 21 so that the clutch element 20 is moved quickly from engaging the said one ratio to engaging the said other ratio. However, to avoid a shock of engagement another period of low rate of pressure drop is arranged between point 104 and point 105 as the outer spring 56 continues to extend until, at point 105, further extension is prevented by the head 61 on the pin 59 abutting the left hand end of the outer cup member 58, as shown in FIG. 5.

Due to the preload in the outer spring 56, the pressure drops steeply from point 105 until the flange 72 moves away from the outer cup member 58 so that the inner spring 66 becomes operative, in conjunction with the relief valve piston 69, to regulate the pressure which falls to the stabilized low value at point 106 and which is indicated by the horizontal line from point 106 to point 107. At point 106 the accumulator piston 53 reaches the left hand end of its travel.

The shape of the pressure versus time graph can be altered as required by appropriate selection of the areas of the accumulator piston 53, the relief valve piston 69, of the rates and fitted loads of the springs and of the axial length of the gaps between the various components as well as by the characteristics of the restrictor 40.

In certain applications a satisfactory installation has been achieved without the section of FIG. 6 from point 102 to point 104, that is the section from point 101 to point 102 is produced to point 108 to meet the section from point 105 to point 104 produced as shown by dotted lines. An embodiment giving this characteristic is shown in FIG. 7 which is identical in every respect to the embodiment shown in FIGS. 1 to 5, except that the light spring 64 and the sleeve 63 are omitted and the pin 59 is fastened to the accumulator piston 53.

Figure 7:
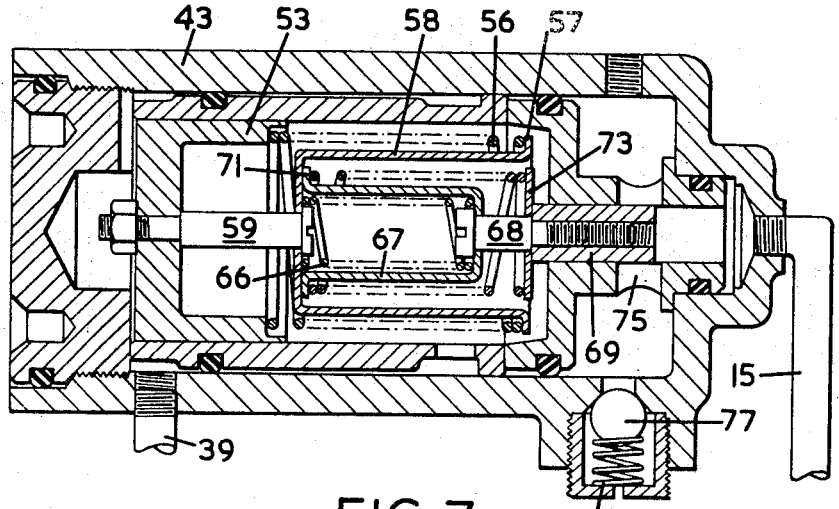
FIG. 7 shows an alternative combined pressure relief valve and accumulator to that shown in FIGS. 1—5.
Figure 8:
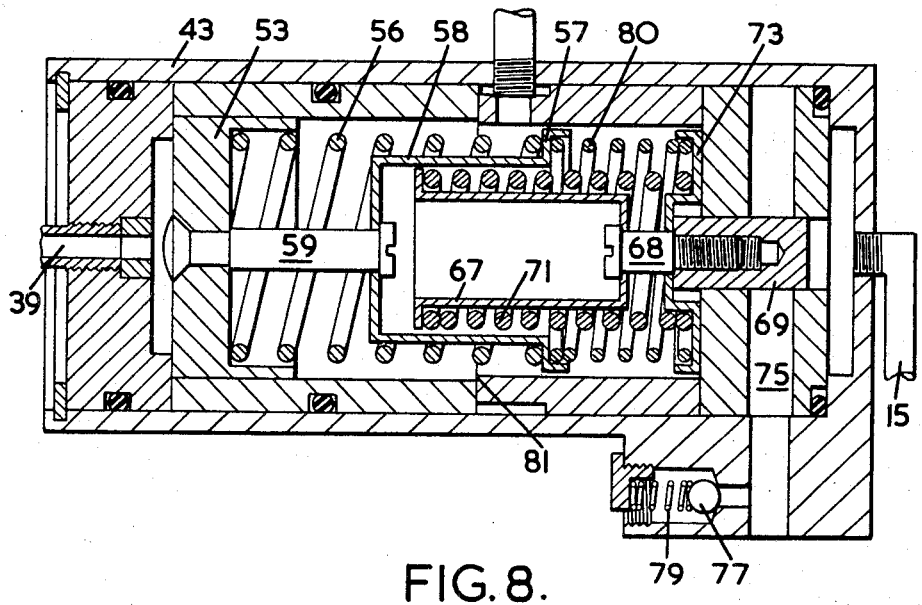
FIG. 8 shows yet another combined pressure relief valve and accumulator.

FIG. 8 shows an embodiment which gives a pressure versus time characteristic identical to the embodiment shown in FIG. 7. Corresponding components in each FIG. perform the same function so FIG. 8 is not described in detail. The functional differences from FIG. 7 are that the spring 80 acts between the outer cup member 58 and the washer 73 but acts in exactly the same manner as the corresponding inner spring 66 in FIG. 7, and excess force on the accumulator piston 53 in FIG. 8 is passed to the casing when the piston 53 reaches a shoulder 81 fast with the casing, instead of transmitting the excess force to the casing through the outer cup member 58 as in FIG. 7.

The springs described in these embodiments could, of course, be substituted by an other suitable bias elements, such as pneumatic resilient elements or hydraulic force producing elements.

If desired, the restrictor 40 may be moved into the duct 39 so that it will be self-cleaning due to the regular reversal of fluid flow through it.

I claim:

1. A fluid control circuit for operating a ratio selecting friction-engaging element in a change-speed gearing of the kind in which the friction-engaging element is operated to a first condition for selecting one drive ratio of the gearing and to a second condition for selecting another drive ratio of the gearing, said control circuit including casing means defining two cylinders, an accumulator piston is slidable in one cylinder and a relief valve piston is slidable in the other cylinder, bias means act between the two pistons, the accumulator piston has a greater effective area than the relief valve piston, a source of pressurised fluid, a control valve optionally operable to two alternative positions each corresponding to one of said conditions of the friction-engaging element, in one position the control valve connects the accumulator piston to the source of pressurised fluid, in the other position the control valve disconnects the accumulator piston from the source of pressurised fluid and connects the accumulator piston to exhaust, the source of pressurised fluid is connected to the relief valve piston to move the relief valve piston in opposition to the force exerted by the bias means until the relief valve piston uncovers a vent aperture through the said casing means to such an extent that the amount of fluid flowing through the vent aperture regulates the pressure of the pressurised fluid to balance the said force on the relief valve piston, wherein the improvement comprises that the said accumulator piston is urged against a first stop by the bias means when the control valve is in the said other position to control the pressure of the fluid to a low value above atmospheric and against a second stop by operating fluid pressure in opposition to the bias means in the said other position to control the pressure of the fluid to a high value, and restrictor means is provided in the said exhaust, whereby when the control valve is moved from the said one to the said other position the pressure in the system will fall from the high value to the low value during which change of pressure the accumulator piston will move from the second stop to the first stop and will displace fluid through the restrictor means which displacement will slow the movement of the accumulator piston so that the pressure will fall slowly until the accumulator piston abuts the first stop after which the pressure will fall rapidly to the said low value.

2. A control circuit, as in claim 1, in which the bias means includes a first bias element acting on the relief valve piston, a second bias element acting on the accumulator piston, the first and second bias elements react in opposite directions on a first abutment member which is arranged to abut the accumulator piston when a predetermined load in the second bias element is reached, whereby as the accumulator piston moves away from the second stop the first abutment member and the entrapped second bias element also move away from the second stop and the relief valve piston causing the bias in the first bias element and therefore the pressure in the system to be reduced rapidly to a first intermediate value at which the friction-engaging element moves out of the engagement with the one drive ratio and into partial engagement with the other drive ratio, and when the force exerted by the operating fluid on the accumulator piston falls below said predetermined load the second bias element extends so that the accumulator piston displaces more fluid through the restrictor whereupon the pressure in the system will fall slowly while engagement of the said other drive ratio continues.

3. A control circuit, as in claim 2, in which the first abutment member is arranged at a predetermined point in its movement to abut a stationary part of the regulating means which constitutes the said second stop.

4. A control circuit, as in claim 3, including first inhibitor means to inhibit further extension of the said second bias element before the accumulator piston reaches the said first stop whereby the pressure in the system will drop quickly so that the final part of the engagement of the said other drive ratio is completed quickly.

5. A control circuit, as in claim 4, in which the said first bias element reacts against the relief valve piston from the said high pressure at which the accumulator piston will engage the said second stop at least down to the first intermediate pressure at which the second bias element becomes operative by the disengagement of the said first abutment member from the accumulator piston, second inhibitor means inhibits further extension of the said first bias element when the pressure of the operating fluid falls below said first intermediate pressure, and a third bias element is operative on the relief valve piston at pressures at least below that at which the said first inhibitor means inhibits further extension of the said second bias element.

6. A control circuit, as in claim 5, in which the first bias element reacts on the relief valve piston, the third bias element reacts on the first abutment member, the first and third bias elements act in opposite directions on a second abutment member which is arranged to abut the first abutment member when the third bias element is to be rendered inoperative.

7. A control circuit, as in claim 6, in which the first inhibitor means includes a first abutment member which is arranged to reach a third abutment member fast with the accumulator piston when further extension of the said second bias element is to be inhibited.

8. A control circuit, as in claim 6, in which the second inhibitor means includes the second abutment member which is arranged to reach a fourth abutment member fast with the relief valve piston when further extension of the said first bias element is to be inhibited.

9. A control circuit, as in claim 6, including a fourth bias element acting on the accumulator piston in the same direction as the second bias element and reacting on a fifth abutment member, the second and fourth bias elements together are arranged to move the accumulator piston away from the first abutment member when the pressure falls to a second intermediate value at which the friction-engaging element will slip if drive torque is being transmitted through the change-speed gearing, and the fluid displaced by the accumulator piston while the second and fourth bias elements are together moving the accumulator piston will cause the pressure to fall slowly whereby, if the change is from a high ratio to a low ratio and drive torque is being transmitted through the change-speed gearing, there will be time for at least partial synchronism of the said other drive ratio before the said one drive ratio is disengaged.

10. A control circuit, as in claim 9, including a third inhibitor means to inhibit further extension of the said fourth bias element before the pressure falls to the value at which the friction-engaging member moves into engagement with the said other ratio, whereby the pressure will fall rapidly from a value at which the friction-engaging member is in slipping engagement with part of the change-speed gearing providing the said one ratio to a value at which it is in slipping engagement with part of the change-speed gearing providing the said other ratio.

11. A control circuit, as in claim 10, in which the third inhibitor means includes a sixth abutment member fast with the third abutment member, and the fourth bias element is arranged to urge the fifth abutment member against the first abutment member until the pressure falls to a value where the fifth abutment member reaches the sixth abutment member to inhibit further extension of the fourth bias element.

12. A control circuit, as in claim 11, in which at least one bias element is a helically coiled compression spring.

13. A control circuit, as in claim 11, in which the first, second and third bias elements are coaxial helically coiled compression springs, the first abutment member is a first coaxial cup shaped member lying substantially within the second bias element, the second bias element reacts against an outwardly turned flange formed at the open end of the first cup shaped member, a pin fast with the accumulator piston is slidable through a first coaxial bore in the closed end of the first cup shaped member and has a head larger than the said first bore to form the said third abutment member, the second abutment member is a second coaxial cup shaped member lying substantially within the first bias element, the first bias element reacts against an outwardly turned flange formed at the open end of the second cup shaped member, a pin fast with the relief valve piston is slidable through a second coaxial bore in the closed end of the second cup shaped member and has a head larger than the said second bore to form the said fourth abutment member, and the third bias element acts between the closed ends of the first and second cup shaped members.